US006597639B1

(12) United States Patent
Hamann et al.

(10) Patent No.: US 6,597,639 B1
(45) Date of Patent: *Jul. 22, 2003

(54) ASSEMBLY SUITABLE FOR WRITING HIGH DENSITY DATA ON A FERROELECTRIC MEDIA

(75) Inventors: Hendrik F. Hamann, Mohegan Lake, NY (US); Yves Martin, Ossining, NY (US); Hemantha Kumar Wickramasinghe, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/559,489

(22) Filed: Apr. 27, 2000

(51) Int. Cl.$^7$ .................. G11B 11/105; G11B 11/06

(52) U.S. Cl. ................ 369/13.01; 369/13.33; 369/126

(58) Field of Search .................. 369/14, 126

(56) References Cited

U.S. PATENT DOCUMENTS

| 3,885,301 | A | * | 5/1975 | Murayama |
| 4,520,409 | A | | 5/1985 | Kimoto et al. |
| 4,785,437 | A | * | 11/1988 | Dransfeld ............... 369/13 |
| 4,794,560 | A | * | 12/1988 | Bell et al. .............. 369/13 X |
| 5,307,311 | A | * | 4/1994 | Sliwa, Jr. .............. 365/174 |
| 5,316,806 | A | * | 5/1994 | Yoshinaga et al. ... 369/275.1 X |
| 5,481,527 | A | * | 1/1996 | Kasnuki et al. ......... 369/126 |
| 5,602,820 | A | * | 2/1997 | Wickramasinghe et al. . 369/126 |
| 5,946,284 | A | * | 8/1999 | Chung et al. ........... 369/126 |
| 5,986,978 | A | | 11/1999 | Rottmayer et al. |
| 6,046,973 | A | * | 4/2000 | Thomas ............... 369/126 |
| 6,069,853 | A | * | 5/2000 | Novotny et al. ......... 369/13.33 |
| 6,233,206 | B1 | * | 5/2001 | Haman et al. ........... 369/13 |
| 6,317,280 | B1 | | 11/2001 | Nakajima et al. |

OTHER PUBLICATIONS

"Principles and Applications of Ferroelectrics and Related Materials" by Lines and Glass (Clarendon Press, Oxford, 1977).
"Disk Recording Beyond 100 Gb/in2: Hybrid Recording?" by J.J. Ruigrok et al. (Journal of Applied Physics 87,5398 (2000).
Thermal Effect Limits in Ultrahigh–density Magnetic Recording: by D. Weller et al. (IEEE Transactions on Magnetics 35, 4423 (1999).
Leakage Current Mechanisms and Accelerated Unified Test of Lead Zirconate Titanate Thin Film Capacitors by K.Yoo et al. (IEEE International Symposium on Applications of Ferroelectrics, 1992).
"Temperature Dependence of Polarization ans Charge Dynamics on the BaTiO3 (100) Surface by Scanning Probe Microscopy" by Sergi V. Kalinin and D. A. Bonnell (Applied Physics Letters 78, 1116 (2001).
"Imaging of Ferroelectric Domain Walls by Force Mircroscopy" by F. Saurenbach et al. (Applied Physics Letters 56, 1703 (1990).
Local Nonvolatile Electronic Writing of Epitaxial Pb(Zr0.52Ti0.48O3)/SrRuO3 Heterostructures by C.H. Ahn et al. (Science 276, 1100 (1997).

(List continued on next page.)

Primary Examiner—Aristotelis M. Psitos
(74) Attorney, Agent, or Firm—Stephen C. Kaufman, Esq.; McGinn & Gibb, PLLC

(57) ABSTRACT

The invention discloses an assembly/methodology for writing/erasing high-density data on a ferroelectric recording media. A preferred embodiment of the invention features a novel thermal near-field heater that may be employed in the assembly, particularly for realizing the methodology in a substantially thermal near-field mode. The invention provides advantages of data storage densities greater than that of diffraction limited systems, for example, data storage densities of approximately greater than 100 Gbit/inch$^2$, and writing speeds approximately greater than 100 MHz.

24 Claims, 8 Drawing Sheets

OTHER PUBLICATIONS

"Surface and Domain Structures of Ferroelectric Crystals Studied with Scanning Force Microscopy" by R. Luethi et al. (Journal of Applied Physics 74, 7461 (1993).

"Nanoscale Visualization and Control of Ferroelectric Domains by Atomic Force Microscopy" by O. Kolosov et al. (Physical Review Letters 74, 4309 (1995).

"Nanoscale Imaging of Domain Dynamics and Retention in Ferroelectric Thin Films" by A. Gruverman et al. (Applied Physics Letters 71, 3492 (1997).

Electromagnetic Theory by J.A. Stratton (McGraw–Hill, New York, 1941).

Handbook of Magneto–optical Data Recording, edited by T.W. McDaniel and R.H. Victoria).

"Specific Heat and Thermal Conductivity of BaTiO3 Polycrystalline Thin Films" by S.T. Davitadze et al. (Applied Physics Letters 80, 1631 (2002).

"Thermal Properties of Glycine Phosphate Across Ferroelectric Phase Transition: a Photopyroelectric Study" by C.P. Menon et al. (Material Research Bulletin 36, 2407 (2001).

* cited by examiner d<2R: NEAR-FIELD
d>2R: FAR-FIELD

ASSEMBLY SUITABLE FOR WRITING HIGH DENSITY DATA ON A FERROELECTRIC MEDIA

CROSS-REFERENCE TO RELATED APPLICATIONS

The instant application is related to U.S. application Ser. No. 09/408,946 filed Sept. 30, 1999 by Wickramasinghe et al, and to U.S. application Ser. No. 09/427,169 filed Oct. 26, 1999 by Hamann et al, which applications are co-pending, commonly assigned, and incorporated by reference herein.

FIELD OF THE INVENTION

This invention relates to a novel assembly and method suitable for writing high density data on a ferroelectric media, the novel assembly being readily further equipped so that it can have a reading capability.

INTRODUCTION TO THE INVENTION

The present invention builds upon the notion of a ferroelectric media. The basic physics of a ferroelectric media are now briefly stated, in order to facilitate an understanding of the present invention and its purview.

In order to give an overview, the term ferroelectricity is conventionally used for certain crystalline dielectric materials that show a permanent polarization. (This is analogous in many ways to the permanent magnetization exhibited by ferromagnetic materials.) For these crystalline dielectric materials, accordingly, a charge displacement may be induced under the influence of an applied electric field. The polarization associated with this displacement creates an internal field, which both increases and stabilizes the induced polarization, with the result that a portion of this polarization remains even after the external field is turned off.

More specifically, an electric field $E_i$ inside a dielectric material induces an electric dipole moment p. The potential energy of this electric dipole moment is given by $-pE_i$. The average value $\overline{(p \cdot \cos(\theta))}$. of this electric dipole moment in the direction of the applied field can be calculated using a Boltzmann distribution $(\exp(-p \cdot E_i \cos(\theta)/kT))$. For a substance with n elementary dipoles per unit volume, the electric polarization (dipole moment per unit area) is then given by $P=n \ \overline{(p \cdot \cos(\theta))}$. Now it needs to be considered that the field $E_i$ acting upon a dipole in the material is the sum of applied E, and that arising from the neighboring dipoles ($\lambda P$). Therefore, the dipole aligning force depends partially upon the degree of alignment (electric polarization) already prevailing; any increase in the electric polarization will result in an increase in the aligning force, which, in turn, will result in an increase in the electric polarization, etc. In short, a cumulative effect is expected. In this way, electric polarization, once triggered, can occur without the application of an external field.

More phenomenologically, and in analogy to B-H hysteresis loops, the polarization of a ferroelectric media increases non-linearly with the field. The susceptibility depends on the applied field. As the field polarizes a typical ferroelectric media, the susceptibilities are very high (>500). However, as the field increases, the polarization saturates. Once the media is polarized and the field is turned off, it exhibits a remaining polarization, also known as remanence. The polarizing field must be negative, to a value known as coercive force, in order to remove this remaining polarization. We note that the value of the coercive force depends on the temperature. Typically, as the temperature increases, the coercive field decreases rapidly until it reaches the Curie-temperature $T_c$. Above the Curie temperature, the thermal fluctuations are too large, so that the material loses its electric polarization.

SUMMARY OF THE INVENTION present invention discloses a novel assembly for writing high density data on a ferroelectric media. To this end, the novel assembly employs a thermal heater which can lower the ferroelectric coercivity of the ferroelectric media by heating the material close or above the Curie-temperature, preferably on a local scale, e.g., preferably by way of a substantially near-field coupling. Preferably, an external electric bias field can then polarize the ferroelectric material. Writing or recording on the ferroelectric media can be enabled by using an information signal for modulating the electric bias field or using an information signal for modulating the power of the incident thermal wave to the ferroelectric media. The remaining polarization on the ferroelectric media can be read by suitable employment of an electric field sensor.

Accordingly, in a first aspect of the present invention, we disclose an assembly for writing high-density data on a recording media as a series of tags comprising a ferroelectric information bit pattern, the assembly comprising:

1) an electric bias field generator for applying an electric bias field on the media;
2) a thermal heater for generating and directing an incident thermal wave to the media; and
3) a controller for coordinating a mutual positioning of the incident thermal wave and the ferroelectric media for inducing a direct thermal coupling therebetween; the assembly acting as a writer by operating the controller so that writing is enabled by using an information signal for modulating a localized thermal wave generated in the vicinity of the ferroelectric media.

In a second aspect of the present invention, we disclose a method for writing high-density data on a recording media as a series of tags comprising a ferroelectric information bit pattern, the method comprising the steps of:

1) applying an electric bias field on the media;
2) generating and directing an incident thermal wave to the media;
3) coordinating a mutual positioning of the incident thermal wave and the ferroelectric media for inducing a direct thermal coupling therebetween; and
4) operating the controller so that writing is enabled by using an information signal for modulating a localized thermal wave generated in the vicinity of the ferroelectric media.

BRIEF DESCRIPTION OF THE DRAWING

The invention is illustrated in the accompanying drawing (not drawn to scale), in which.

DETAILED DESCRIPTION OF THE INVENTION

Overview of Assembly

Figure 1:
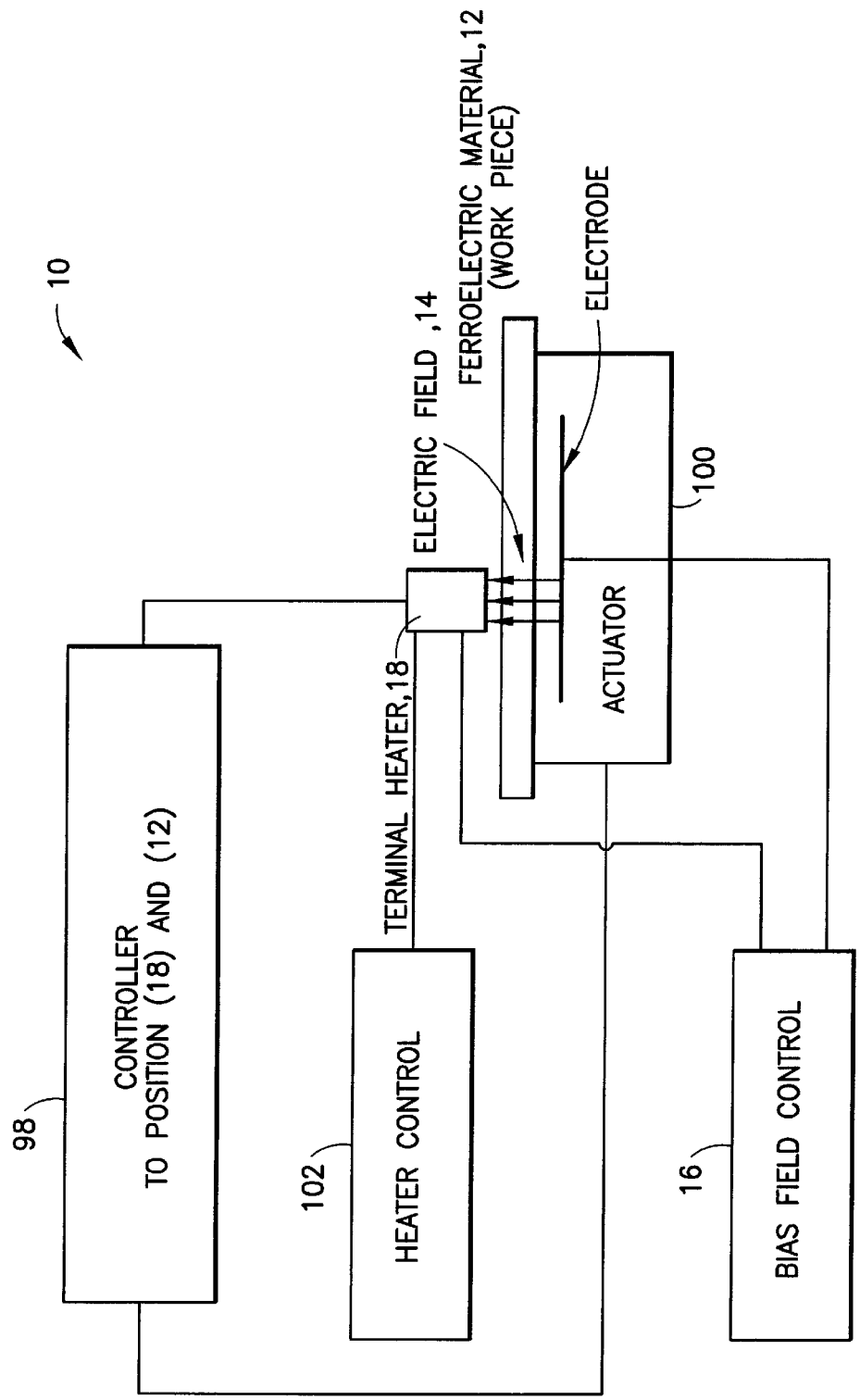
FIG. 1 shows a generalized assembly for writing data on a ferroelectric media that can be built in accordance with principles of the present invention.

FIG. 1 shows a generalized assembly (10) constructed in accordance with the invention as summarized above. In overview, the FIG. 1 assembly (10) can function to write high density data on a ferroelectric recording media (12), for example, a media (12) comprising $BaTiO_3$, $T_c=120°$ C.), $PbTiO_3$ ($T_c=490°$ C.), lead iron niobate ($T_c=112°$ C.), triglycine sulphate ($T_c=49°$ C.), or $NaKC_4H_4O_6 \cdot 4H_2O$) etc.

Electric Field Generator

The FIG. 1 assembly (10) requires means for applying an electric bias field (14) on the media (12), which can be controlled by a controller (16). In general, this electric field can be global as well as local and it can have any direction. For a local electric field, a thermal heater (18) may be used as a local counter electrode. This electric field can be pulsed or permanent, and in some cases, no electric bias field at all may be needed to record on a ferroelectric media. Note that the electric bias field (14) can assist in writing as well as maintaining or stabilizing the electric charge distribution of surrounding media material.

Thermal Heater

The FIG. 1 assembly (10) requires a thermal heater (18) for generating and directing an incident thermal wave to the media (12). As an example, the assembly (10) may implement a thermal near-field heater in the form of an atomic force microscope probe (AFM), utilizing an AFM's cantilever as a heating plate and heat sink.

Near-Field Thermal Heater

A suitable near-field thermal heater may comprise two elements: a heating plate that can operate as a heat source; and, a heat sink attached to the heating plate; the heater capable of developing a thermal near-field coupling with the ferroelectric media (12).

Attention is now directed to FIGS. 2A–D, which help illustrate the many different geometrical, dimensional, and material configurations which may be suitably adapted for a particular realization of a novel thermal near-field heater.

In overview of the FIGS. 2A–D thermal near-field heaters, it is noted that their purpose is to deposit heat energy to the ferroelectric media (12). This energy can be almost any kind; e.g., coherent or non-coherent excitons, plasmons, phonons, photons, etc., and it can be delivered in any mode, e.g., as convective, radiative, or conductive transfer. For example, it can be delivered in any mode from the heat source to the media (12). The heat transfer (see J. B. Xu, K. Läuger, R. Möller, K. Dransfeld, I. H. Wilsom, J. Appl. Phys. 76, 7209 (1994)) is generally diffusive, if the mean free path of molecules $\lambda$ is much less than the distance of the heater to media d. However, if the $d<\lambda$, the molecules in the junction go from the heater to the media without collisions, and transfer the heat in a ballistic manner. In addition, in the far-field heat can be transferred via propagating radiation according to the Stefan-Boltzmann law. Furthermore, non-propagating waves (near-field) are capable of transferring the heat via a tunneling process when heater and media are very close to each other (near-field region). From a physics point of view, the charges within the near-field heater are thermally excited, which generate a significant driving field of the thermal heater. This driving field generates consequently a near-field of the heater, which couples to the thermo-ferroelectric material, and thus heats it up. It is noted that this effect can be maximized by using a resistive conductor (such as carbon). In addition, this effect can be enhanced by implementing an elongated shape as well as a very small end radius of the heater.

Good geometrical conductors for our thermal near-field heater may include rectangular or cylindrical design, of the type shown in FIGS. 2, A, B, respectively (numerals 20–30).

For example, the preferred dimensions of $y_1$ and $z_1$ (FIG. 2A) or $r_1$ (FIG. 2B) are informed by the way the thermal energy is to be deposited. For instance, if one uses a focused laser beam to heat up the heating plates (22, 28), $y_1$ and $z_1$ or $r_1$ preferably are larger than the waist of the laser focus (e.g., for a numerical aperture of 0.8 $y_1$, $z_1$, $r_1 > 0.8$ micrometer). If, on the other hand, one uses a wave-guided laser beam, then the heating plate (22,28) preferably is attached right onto the end of a fiber (maybe via vapor deposition). Therefore, the heating plate (26) preferably has a cylindrical shape, and ri is determined by the wave-guide size. More specifically, for a single mode fiber in the visible wavelength range, $r_1$ preferably is approximately 3–4 micrometer. If one uses tapered fiber, $r_1$ preferably is larger than or equal $\lambda \approx /2$, where $\lambda$ is the wavelength of the utilized laser light. If, alternatively, one uses resistive heating, then one chooses, most likely, a rectangular shape, and the dimensions are preferably dominated by the connections and the resulting resistance.

In the case of resistive heating, these dimensions can be rather small ($y_1$, $z_1 < 0.1$ micrometer) if they are made via e-beam lithography. We note that in the case of resistive heating, the dimensions as well as the material determine the actual resistance, and hence the heating.

While the $y_1$, $z_1$, $r_1$ dimensions are determined mostly by practical needs, the thickness of the heating plate (22,28) itself should be rather small ($d_1$, $x_1 < 0.5$ micrometer), for example, if the device is to be used for high speed recording. More specifically, in high speed applications, one preferably uses energy pulses to deposit the heat in the heating plate, so as to subsequently heat up the near-field heat source, e.g., a tip or an edge of the heating plate.

In order to heat up again, the deposited heat (from a last pulse), has to be dissipated. This dissipation is governed by the thermal diffusion length $l=(\kappa \cdot \tau)^{0.5}{}_1$, where $\kappa$ is the thermal diffusivity and $\tau$ is the time after the arrival of a heat pulse. Specifically, the heat in a good thermal conductor (approximately $\kappa=2 \cdot 10^{-5} m^2 s^{-1}$) can diffuse a distance of 0.45 micrometer in only 10 ns, corresponding to recording rates of 100 MHz. If one uses a laser beam to deposit the heat, it is noted that the heating plate (22,28) preferably should be at least of the thickness of the skin depth at the laser frequency. Specifically, for a very high absorbing material (e.g., Al) it preferably is larger than 10 nm at 633 nm.

The heating plate (22,28) can be made out of any material, but in general the following requirements preferably exist.

(1) The material preferably has a high melting point (T>1100 K), generally higher than the temperature, which is necessary for the recording. (2) It preferably has a high thermal diffusivity ($\kappa > 1 \cdot 10^{-5} m^2 s^{-1}$, e.g., metals and allows). (3) The material preferably is high absorbing if a laser is used for the heating (e.g., Cr, Al). (4) If the heating plate operates as the heat source, a resistive conductor may be preferred, especially in order to maximize the heat transfer from the heater to the ferroelectric material via near-field coupling.

Figure 2A:
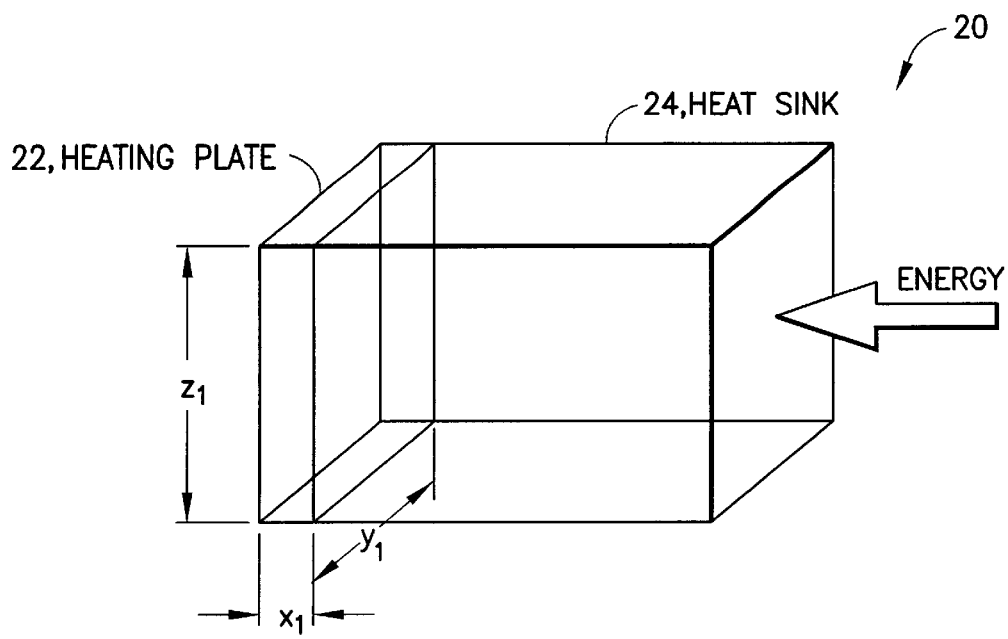
FIGS. 2 A–D show alternative embodiments of a near-field thermal heater with emphasis on its heating plate which can act as a heat source, that may be employed in the FIG. 1 assembly.
Figure 2B:
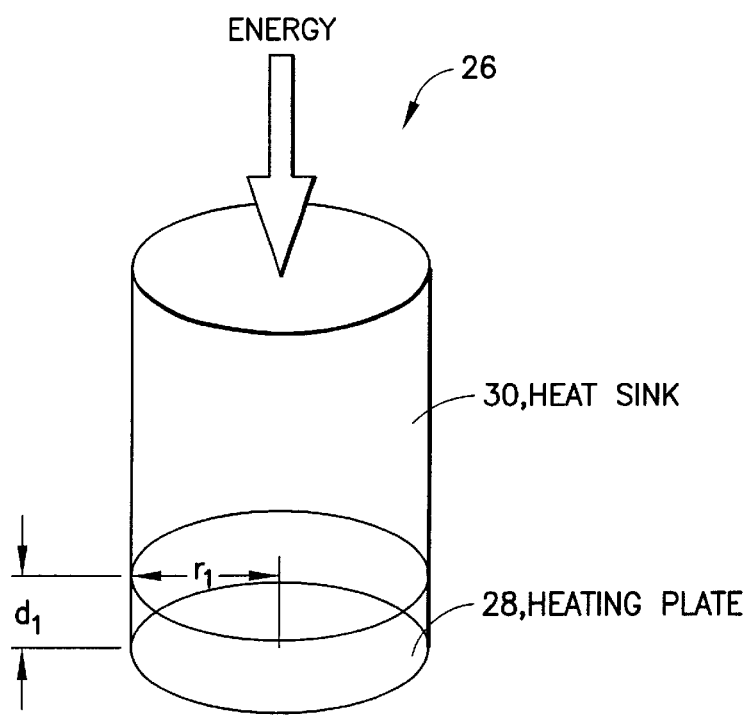
Figure 2C:
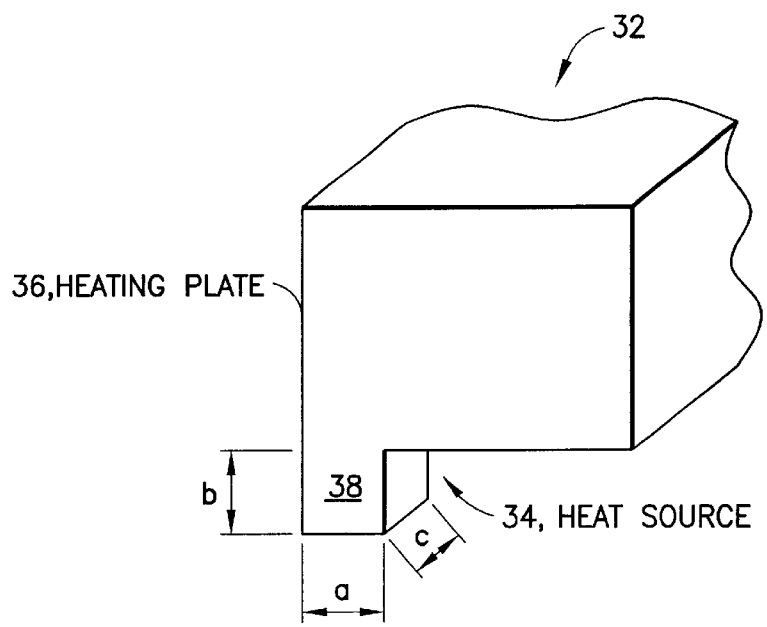
Figure 2D:
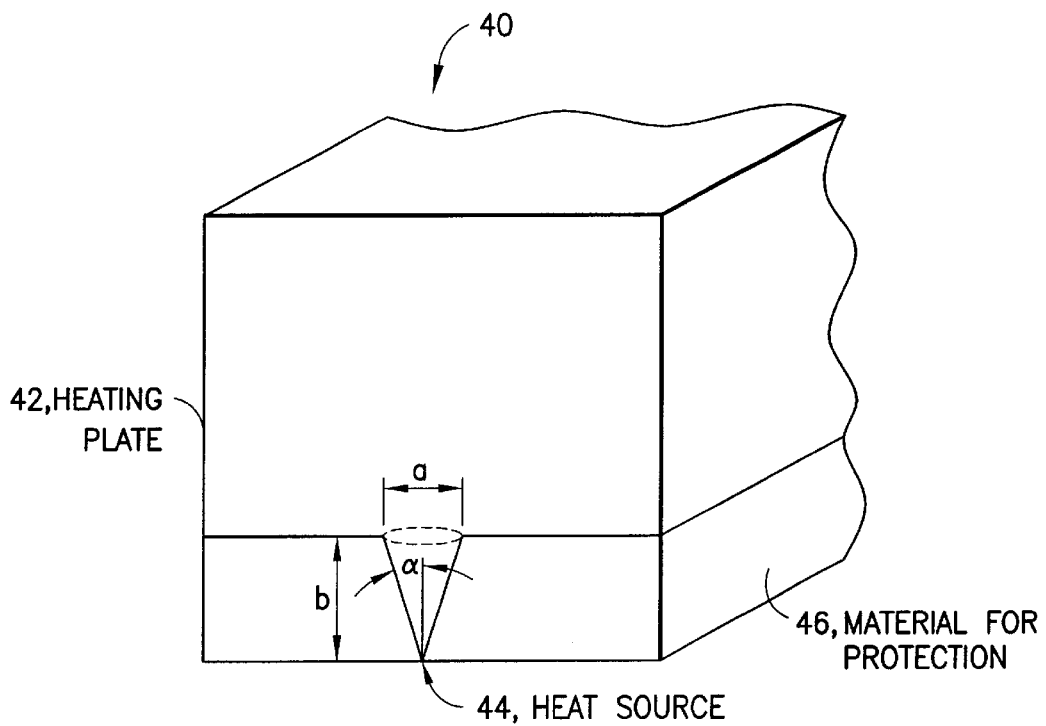

As explained above, a generic purpose of the heat plate operating as a heat source is to guide the thermal energy to the ferroelectric media (12). It should be noted that the heating plate is generally hot, and hence generally capable of heating the media. However, such general heating may not always be optimal, since the dimensions of the heating plate may be large, resulting in a large bit. One purpose of the heat source, accordingly, may be to avoid general heating from the heating plate, and to instead focus the thermal energy to a very small point. An attendant and novel property is then to generate a thermal near-field, which can interact very locally, preferably on a nanometer scale, with the media. To this end, the heating plate operating as a heat source can have all kinds of shapes and dimensions. For example, the heat source may be just an edge (38) of a heating plate (36) (FIG. 2C), or a truncated cone (44) of a heating plate (42) (FIG. 2D). Sometimes, the heat source may be usefully protected by some low heat conducting material (46) (e.g., glass).

Overall, the shape and dimensions of the heating plate operating as a heat source are influenced by the following requirements. (1) For high speed application, a designer preferably chooses shape and dimensions which transfer the heat as fast as possible. In general, that means that a heat source preferable should have a small length b (e.g., b<0.5 micrometer), in order to achieve sufficient heat dissipation within its thermal diffusion length. If one just considers high speed applications, one may be tempted to choose large dimensions of a, c (FIG. 2C) and a, $\alpha$ (FIG. 2d) in order to avoid a slow one-dimensional heat conduction. (2) However, besides high speed, a heat source preferably provides a very local heating, avoiding any stray heat from the heating plate, generally, Accordingly, this correlates with opposite requirements for the dimensions. For a very local heating, preferably choose b large (>0.1 micrometer), and the dimensions a,c small (<0.01 micrometer) (FIG. 2C) as well as a small a and $\alpha$ (a<0.1 micrometer, $\alpha<15°$, FIG. 2D). We note increasing power loss with decreasing dimensions in a,c (FIG. 2C) and a, $\alpha$ (FIG. 2D), which may result in insufficient and very ineffective heating. (3) The shape and dimensions of the heat source are preferably matched to a bit size and a bit pattern. In general, the bits are typically larger or equal to the dimensions of a heat source. Specifically, for a 20 nm bit, preferably work with a heat source of the dimensions a,c<<20 nm (FIG. 2C). (4) Finally, in order to maximize the thermal near-field coupling (as outlined above), an elongated shape with a sharp tip-like point may be preferred.

The material of the heating plate can be almost any kind. We note that an edge or tip material is preferably governed by the same general material requirements as that of the heating plate, proper.

We recall from above that our preferred thermal near-field heater includes a second element, namely, a heat sink attached to the heating plate. We now turn our particular attention to this second element.

Figure 3A:
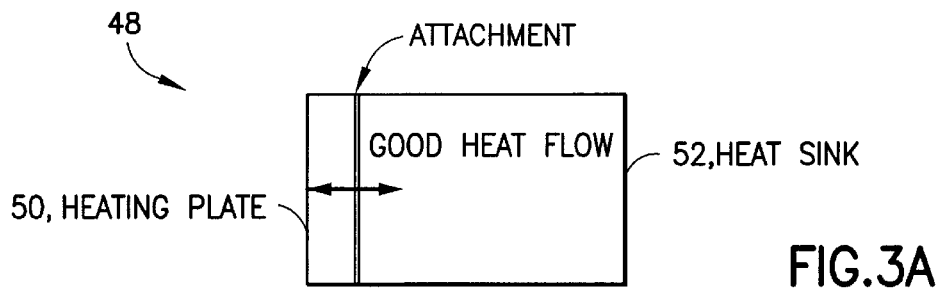
FIGS. 3 A–C how alternative embodiments of the FIG. 2 near-field thermal heater, with emphasis on its heat sink.

An important purpose of the heat sink is to dissipate deposited heat as fast as possible, in order to get ready for a new heating pulse. Therefore, the heat sink is preferably attached to the heating plate (FIG. 3A, numerals 48–52). This attachment preferably is made in such a way that the heat conduction between heat sink and heating plate is as good as possible ($\kappa > 1 \cdot 10^{-5} m^2 s^{-1}$). Therefore, it may be very advantageous if the heat sink and the heating plate are made out of the same piece of material. In other cases, the heat sink may be welded, glued, or deposited (via e-beam, vapor, sputtering etc.) right on the heating plate.

Figure 3B:
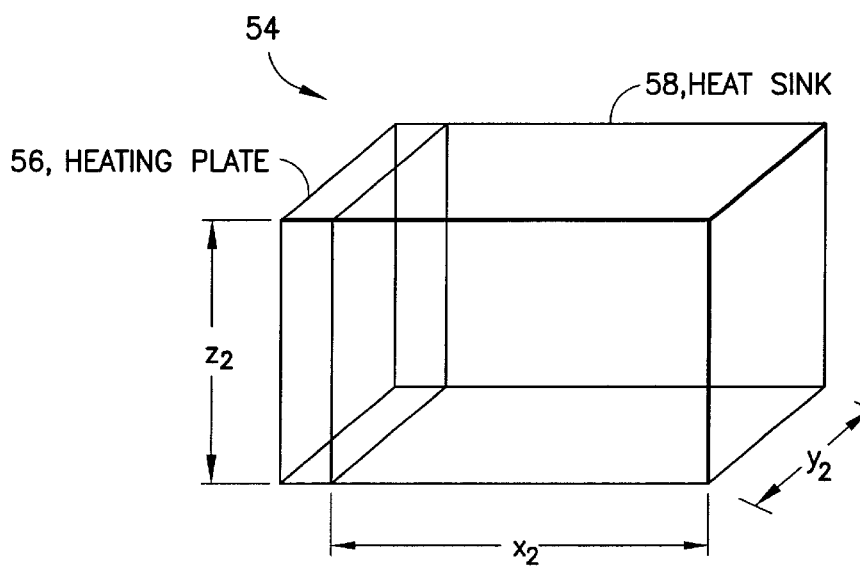
Figure 3C:
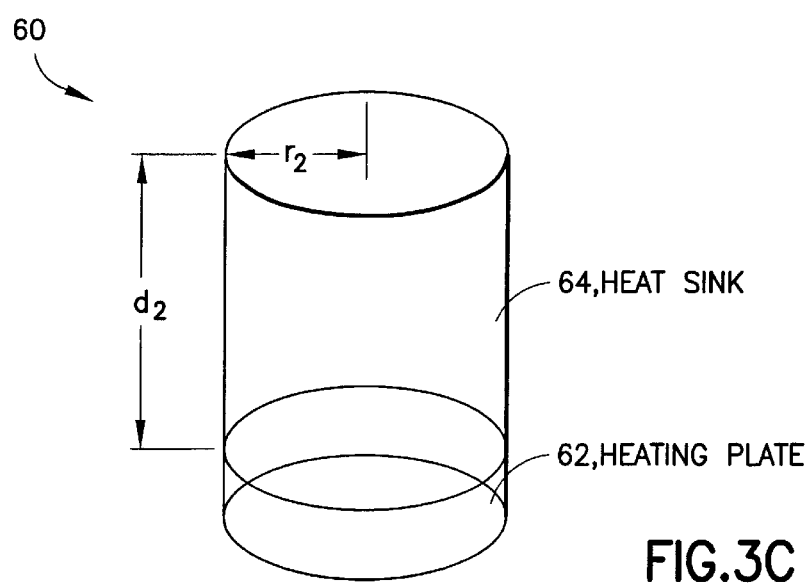

Dimensions and shape for the heat sink are not very critical, so that only guidelines can be given here. In general, the heat sink can have all kinds of shapes. However, in typical cases, it may be rectangular or cylindrical (see FIGS. 3B, C, numerals 54–64). To provide a sufficient heat sink mass, the heat sink preferably is as large as possible. Large dimensions (>1 micrometer) of $y_2$, $z_2$ and $r_2$ may result in a three-dimensional heat flow greatly enhancing the speed for heat dissipation. The dimensions and the shape of the heat sink do not have to necessarily match the dimensions of the attached heating plate. However, in general the heat sink preferably has dimensions larger or equal to the heating plate (e.g., $y_2 > y_1$, $z_2 > z_1$, $r_2 > r_1$). In terms of the thickness of the heat sink, we note that $d_2$ and $x_2$ should preferably be at least the thermal diffusion length l for a given heating repetition rate 1/t. The material of the heat source can be almost any kind. In analogy to the heating plate and the heat tip or edge, the material of the heat sink preferably has a high melting point as well as a high heat conductivity. However, in some cases the material should not be high absorbing at the laser wavelength, if the laser has to be focused on the heating plate through the heat sink material. In such case, preferably use a transparent material, which is still a good heat conductor and has a high melting point (e.g., diamond).

The Thermal Near-Field

It is asserted above that the invention advantageously uses the idea of direct thermal coupling between a heater and a ferroelectric media, and, that this coupling can subsume far-field and/or near-field effects. In particular, near-field effects may include a continuum that may extend from coupling that subsumes at least one portion of the thermal near-field; ranging e.g., from partially inclusive, to substantially or even complete coupling in the thermal near-field. We now provide a working definition, for the purposes of a utility of this invention, of the thermal near-field, a utility of the invention generally captured in the notion that increased storage and speed generally correlate to operating more extensively in the thermal near-field.

Figure 4:
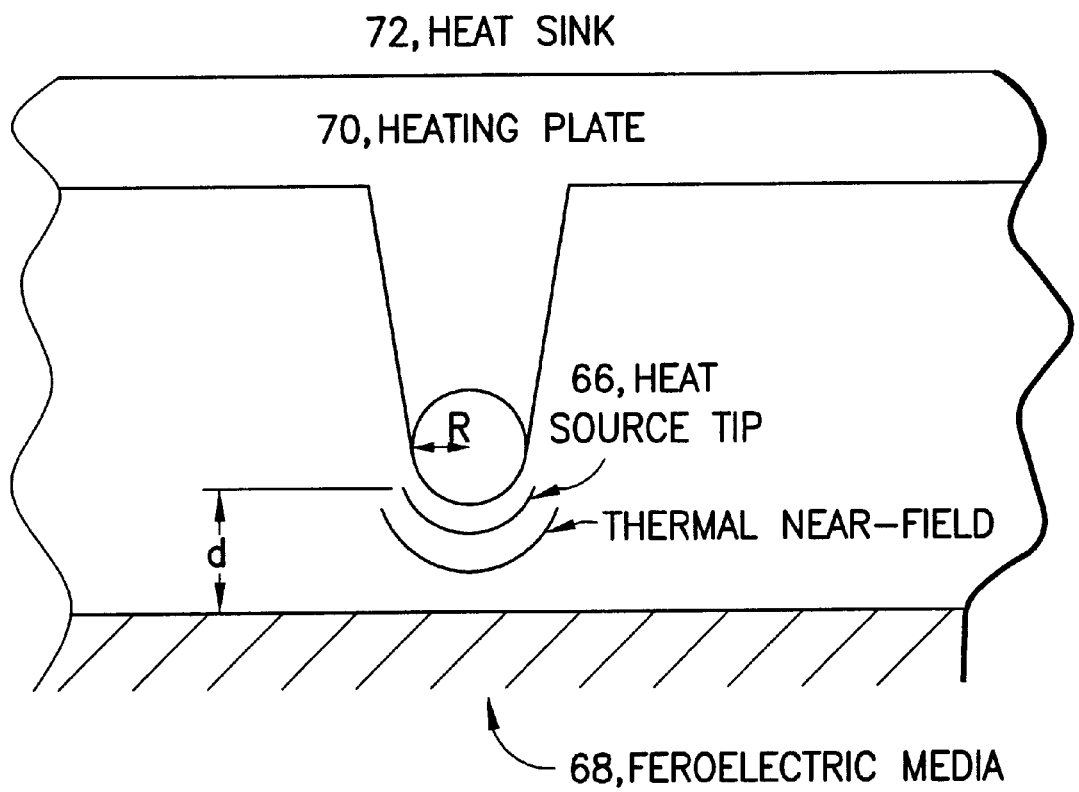
FIG. 4 provides a schematic useful for developing the notion of a near and far-field, as this concept relates to the present invention.

The concept of the thermal near-field is now explained, using an illustrative FIG. 4. Here, a heat source tip (66) interacts via its thermal near-field with a ferroelectric media (68). For discussion purpose, the FIG. 4 heat source tip (66) is spherical at its end with a radius R. For purposes of this invention, the thermal near-field region is the area generally within approximately 2 R away from the heat source tip (66). The rest of the area is generally called far-field. We note that in the near-field region, the extent of the thermal energy is generally governed by the heat source tip dimensions. Therefore, if the heat source tip is brought within approximately 2 R to the ferroelectric media (68), very local, nanoscale heating of the media can be achieved. A heated area is then determined by the heat source dimensions, rather than the energy or wavelength, which is a basic idea of this aspect of the invention.

In this particular application of heat flow, in the far-field the heat is transferred via diffusion as well as via radiation according to the Stefan-Boltzmann law. In the near-field, a ballistic heat flow, where a gas molecule picks up some energy form the heater and transfers it without collisions to the media, as well as heat conduction via non-propagating waves, are important. We also note that contamination layers on the surface may contribute significant heat flow as well as intermittent contact between heater and ferroelectric material.

Heat Supply Systems

Figure 5:
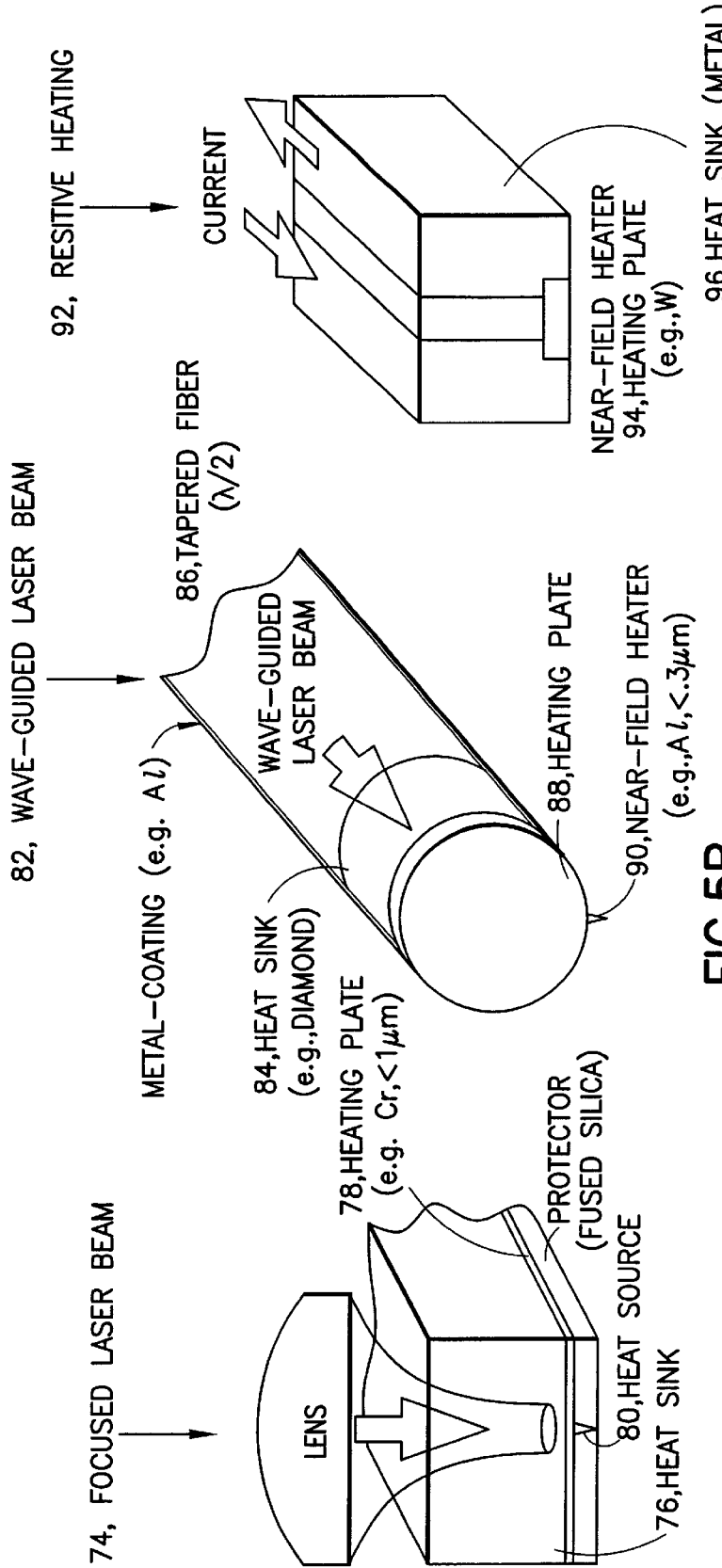
FIGS. 5A–C show illustrative embodiments of mechanisms for depositing thermal energy to the invention's thermal heater.

There are different ways of supplying the thermal energy; examples are illustrated in FIGS. 5A, B, C.

FIG. 5A shows a focused laser beam embodiment (74), wherein laser light is brought through a heat sink (76) onto a heating plate (78). In this case, we prefer the use of diamond as a heat sink material, which is transparent and has an excellent heat conductivity. An alternative material could be Si, if an infrared laser is used. The heating plate (78) can be very thin (0.1 micrometer) if a high absorbing material is used (e.g., Al, Cr.). Directly attached to the heating plate (76) is a heat tip or feature (80), which preferably is short (<0.3 micrometer). The material of the heat tip or feature (80) can be Cr as well or Al. In these cases, the heat tip or feature preferably is protected with a low heat conducting material, such as glass. Simple estimations about the heat flow suggest that such a device can record data with >100 MHz.

FIG. 5B shows an alternative embodiment comprising a wave-guide laser beam (82) used for the heating. In this embodiment, a heat sink (84), which preferably is made out of diamond, may be directly attached to the end of a fiber (86). In other cases, a metal-coating (e.g., Al) of the wave-guide can be used as the heat sink. The wave-guide laser beam is absorbed by a thin (<0.1 micrometer) heating plate (88) directly attached to the fiber or heat sink. Again as a material, Cr or Al may be advantageous, which have generally a small skin depth (<0.02 micrometer). A heat source or tip (90) can be an edge or a little probe attached to the heating plate (88). In such a design, the heat source or tip exemplary has a length <0.3 micrometer.

FIG. 5C shows a further alternative embodiment wherein resistive heating (92) may be used to heat up a heating plate (94). As a heat sink (94), the transmission lines could be used, which may be out of a metal such as Cu. The two transmission lines are separated by a non-conducting material, for example, diamond or even glass. Diamond has an advantage, in that it is a very good heat conductor, and can assist the heat sink (94). The two transmission lines are connected via the heating plate (92), which can act as a heating source. The heating plate (92) can be very small, e.g., (<0.05 micrometer). As a material for heating plate and the heat source, tungsten or carbon may be very suitable, because of its resistance and high melting point.

Thermal Heater Comprising An AFM Probe

As asserted above, the FIG. 1 assembly (10) contemplates that the thermal heater (16) may comprise an atomic force microscope probe (AFM). AFM's are generally discussed in U.S. Pat. No. 4,343,993, incorporated by reference herein. For our purposes, the AFM's cantilever can function as heating plate and heat sink. Thus, a laser focused onto the cantilever (heating plate) can be used to heat up the probe. Also, resistive heating with an AFM probe can be used.

Controller

The FIG. 1 assembly (10) includes a controller (98) for coordinating a mutual positioning of the incident thermal wave generated by (18) and the media (12) for inducing a direct thermal coupling therebetween. Preferably, this controller (98) functions so that the coupling subsumes at least one portion of the thermal near-field. A suitable such controller preferably uses an actuator (100), which actuator (100) may be selected from the group consisting of a piezo-electric actuator, an electro-static actuator, an electro-magnetic actuator, a magnetic-strictive actuator, and a thermal-mechanical actuator.

The FIG. 1 assembly (10) includes the controller (16) for enabling bias field control, and a controller (102) for enabling thermal heater control. In order to control the writing process, the electric bias field and/or the thermal heater have to be controlled precisely. The thermal heating can be controlled by modulating a laser (e.g., liquid crystal, Bragg cell, current modulation etc.) if a laser is used, or by simply modulating the supplied current if resistive heating is implemented. If a pulsed electric field and pulsed heating are used, then we note, that in general the pulse of the bias field has to be longer than the heating in order to prevent the written information being erased by the heating.

Figure 6:
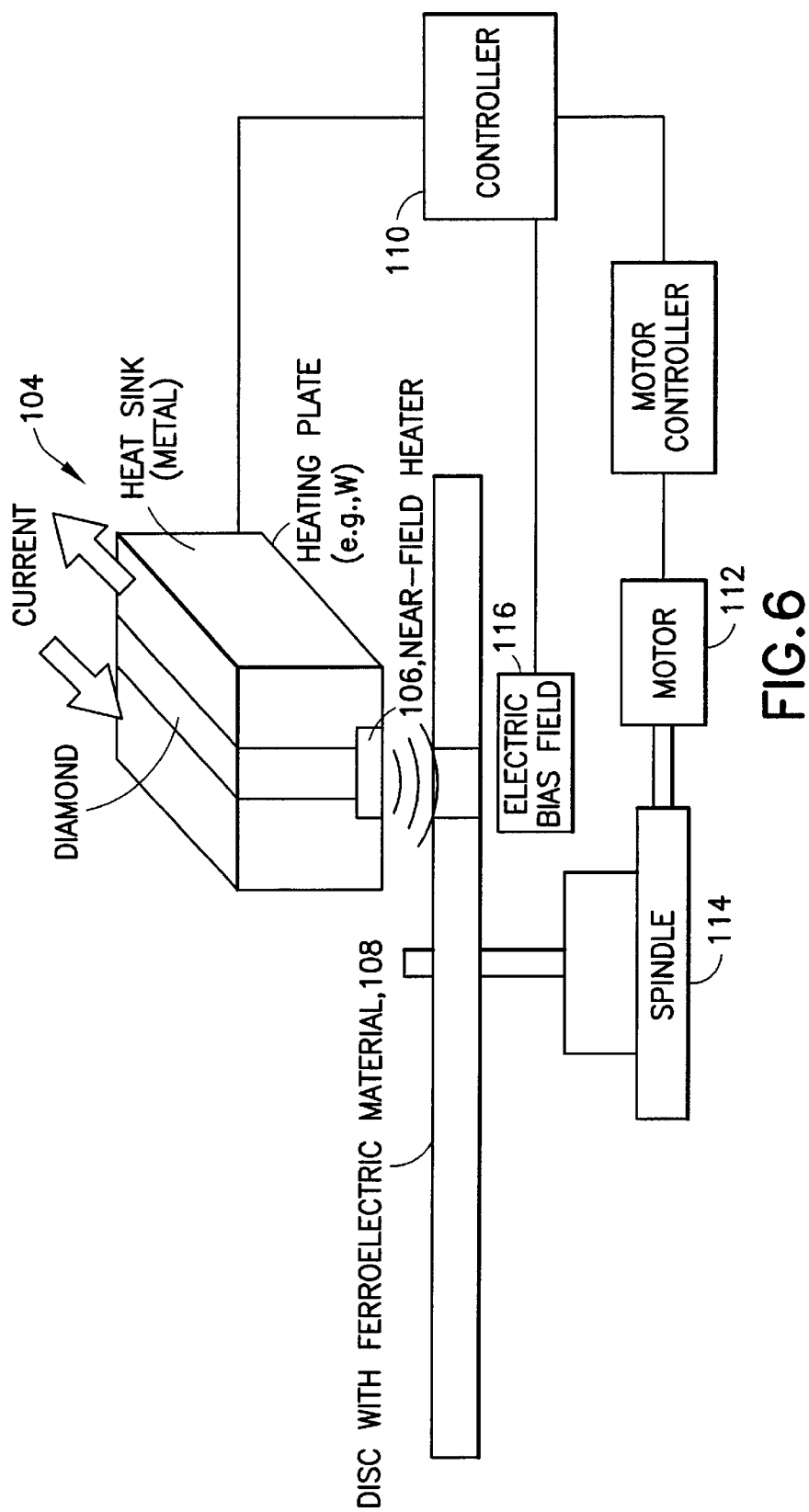
FIG. 6 shows a more specific assembly for writing data on a ferroelectric media with a spinning disc.

FIG. 6 shows an assembly (numerals 104–116) that may be built in fulfillment of this idea. The assembly (104) includes a source of thermal radiation (106) for directing a incident thermal wave to a disc comprising a ferroelectric material (108). A controller (110)—motor (112)—spindle (114) assembly may be employed for coordinating a mutual positioning of the incident thermal wave and the ferroelectric material (108), for inducing a direct near-field or far-field thermal coupling, therebetween. An electric bias field (116) can be modulated by a controller (110). Operation of the FIG. 6 assembly (104) may be effected in accordance with methodology summarized above; namely, writing/erasing high-density data by at least one of using an information signal for modulating the electric bias field or the power of the incident thermal wave to the ferroelectric media (108). Note in this regard and as mentioned above, that the bias field may be pulsed, or permanent, or any direction, or may be global or local; and the thermal wave can be pulsed or continuous.

Electric Field Sensor

Figure 7:
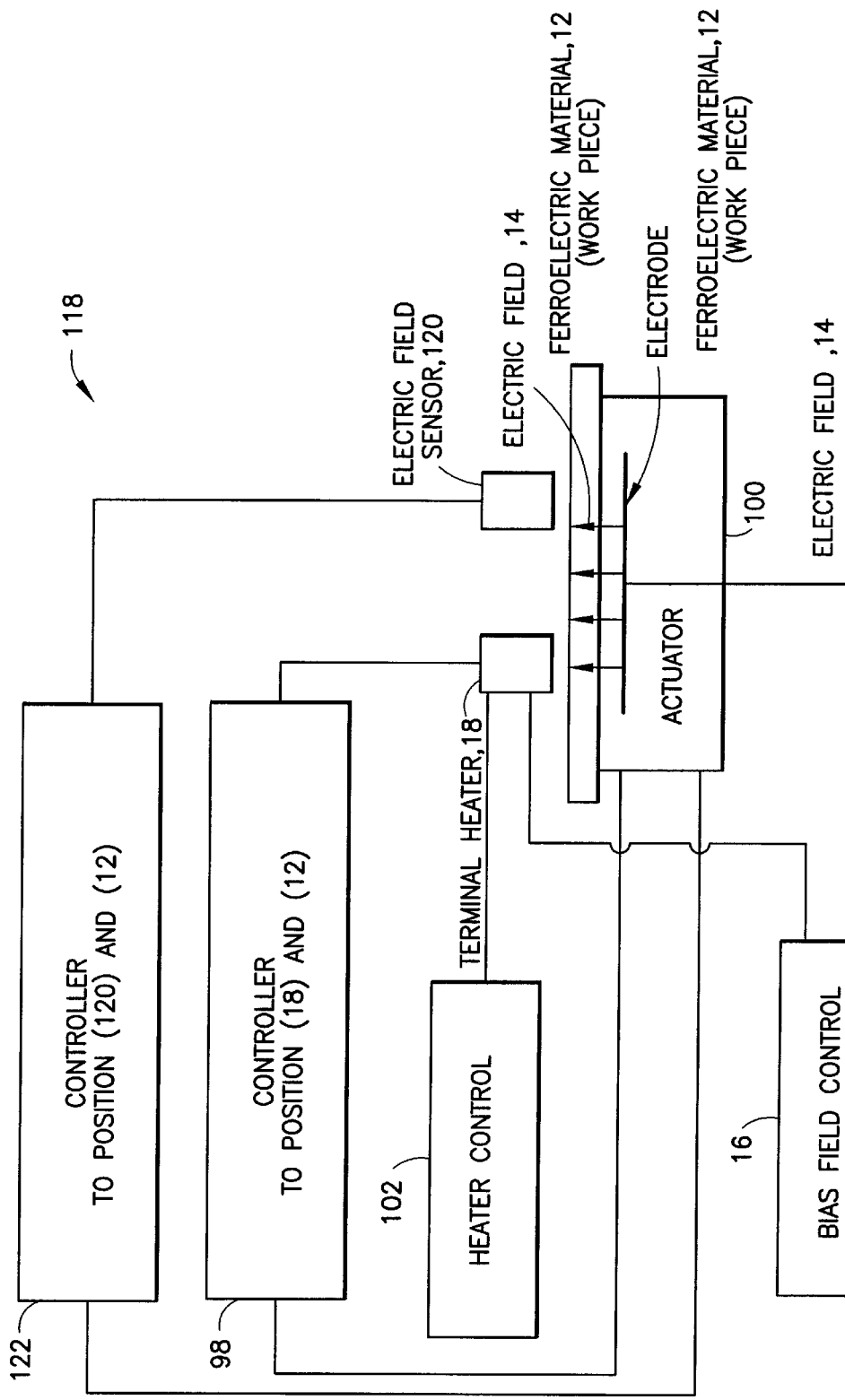
FIG. 7 shows a generalized assembly for writing and reading data on a ferroelectric media.

In a FIG. 7 assembly (118), a read out capability is added to the FIG. 6 assembly writer. By way of comparison with FIG. 1, an electric field sensor (120) is capable of reading the stored information on the ferroelectric material. This electric field sensor may comprise any charge-sensitive sensing, capacitive sensing, force sensing or even near-field optical sensing. A controller (122) is implemented to coordinate the mutual positioning between the electric field sensor (120) and the ferroelectric material.

What is claimed:

1. An assembly for writing high-density data on a recording medium as a series of tags comprising a ferroelectric information bit pattern, the assembly comprising:

an electric bias field generator for applying an electric bias field on said medium;

a thermal heater for generating and directing an incident thermal wave to said medium so as to thermally couple said thermal heater and said medium; and a controller for coordinating a mutual positioning of the incident thermal wave and said medium for inducing said thermal coupling.

2. An assembly according to claim 1, wherein the thermal heater comprises:

a heating plate that can operate as a heat source; and a heat sink attached to the heating plate, wherein said heating plate is thermally coupled to said recording medium in at least a portion of a thermal near-field.

3. An assembly according to claim 2, wherein the heating plate comprises a tip that operates as t heat source.

4. An assembly according to claim 2, wherein the heating plate defines a dedicated edge that operates as the heat source.

5. An assembly according to claim 2, further comprising:
a focused laser beam thermally coupled to the heat sink.

6. An assembly according to claim 2, further comprising:
a wave-guided laser beam thermally coupled to the heat sink.

7. An assembly according to claim 2, further comprising:
a resistive heating unit thermally coupled to the heat sink.

8. An assembly according to claim 1, wherein the thermal heater comprises an atomic force microscope probe.

9. An assembly according to claim 1, wherein a thermal coupling between said thermal heater and said medium subsumes all of said thermal near-field.

10. An assembly for reading/writing high-density data on a recording medium as a series of tags comprising a ferroelectric information bit pattern, the assembly comprising:
an electric bias field generator for applying an electric bias field on said medium;
a thermal heater for generating and directing an incident thermal wave to said medium so as to thermally couple said thermal heater and said medium; and
a controller for coordinating a mutual positioning of the incident thermal wave and said medium for inducing said thermal coupling; and
an electric field sensor positioned near said medium for reading stored information on said medium.

11. An assembly according to claim 10, wherein the electric field sensor comprises a charge-sensitive sensor.

12. An assembly according to claim 10, wherein the electric field sensor comprises a capacitive sensor.

13. An assembly according to claim 10, wherein the electric field sensor comprises a near-field optical sensor.

14. An assembly according to claim 10, wherein the electric field sensor and the thermal heater comprise a same type of element.

15. A method for writing high-density data on a recording medium as a series of tags comprising a ferroelectric information bit pattern, the method comprising:
applying an electric bias field on said medium;
generating and directing an incident thermal wave to said medium so as to thermally couple a heat source generating said incident thermal wave and said medium;
coordinating a mutual positioning of the incident thermal wave and said medium for inducing said thermal coupling; and
controlling a writing operation by controlling at least one of said electric bias field and said incident thermal wave.

16. A method according to claim 15, wherein said applying an electric bias field comprises applying a local electric bias field.

17. A method according to claim 15, wherein said applying an electric bias field comprises applying a global bias field.

18. A method according to claim 15, wherein said applying an electric bias field comprises applying a permanent bias field.

19. A method according to claim 15, wherein said applying an electric bias comprises applying a pulsed bias field.

20. A method according to claim 15, wherein said electric bias field stabilizes an electric charge distribution of surrounding medium material.

21. A method according to claim 15, wherein said thermal heater is incorporated as part of a slider for use over a spinning disc.

22. A method according to claim 15, wherein said writing is controlled by using an information signal for modulating the applied electric bias field.

23. A method according to claim 15, wherein said writing is controlled by using an information signal for modulating the incident thermal wave to said medium.

24. A method for writing data on a ferroelectric recording medium, said method comprising:
generating a thermal wave incident to said medium;
coordinating a mutual positioning of a source of said thermal wave and said medium so as to induce a thermal coupling between said source and said medium;
applying an electric bias field to said medium so as to write data on said medium in the form of a ferroelectric bit pattern.

* * * * *